March 10, 1953     G. D. ZIMMERMAN     2,630,714
REMOTE INDICATOR DRIVING ATTACHMENT
FOR GAS METERING DEVICES
Filed Aug. 30, 1949     3 Sheets-Sheet 1
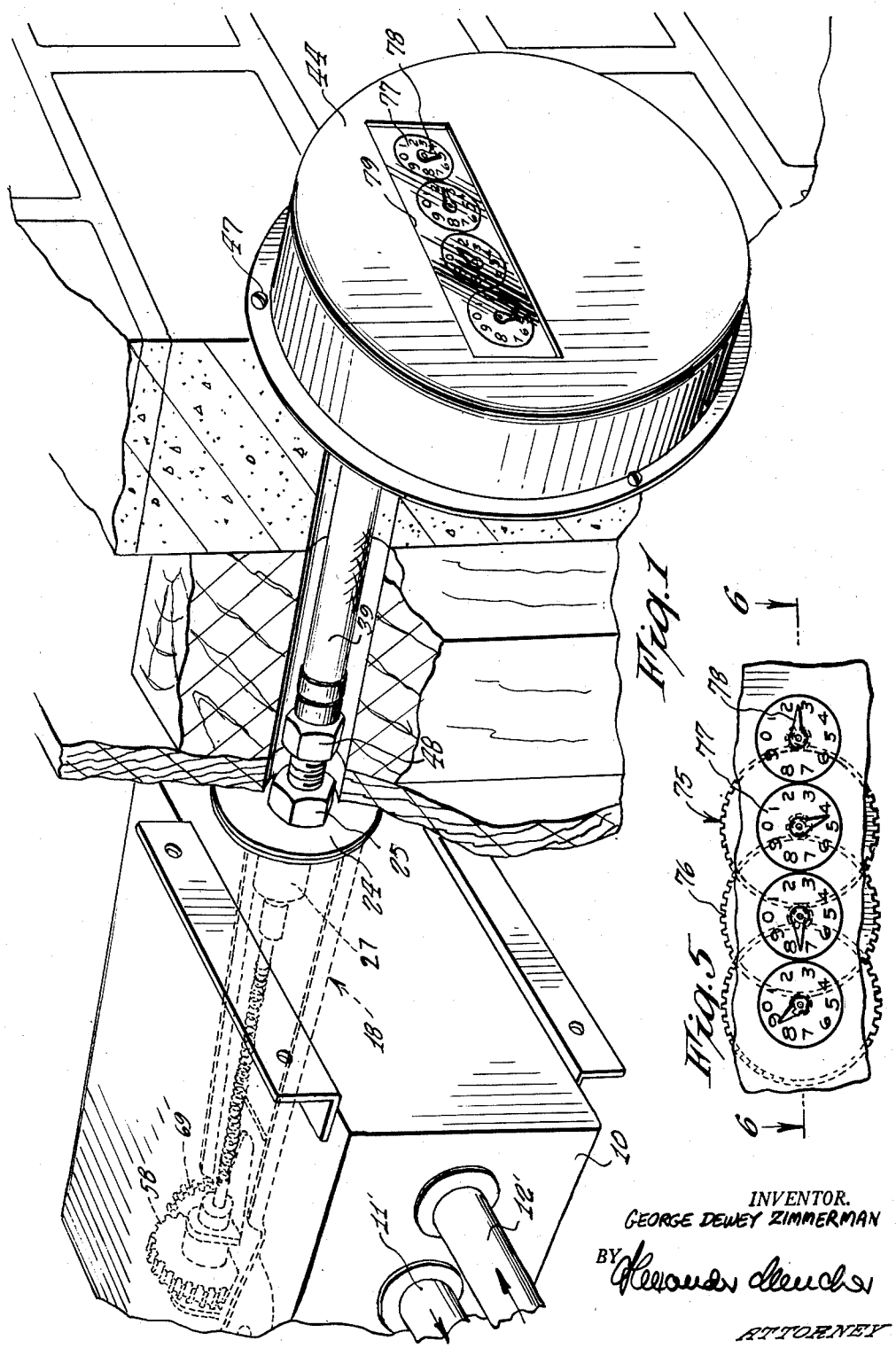
INVENTOR.
GEORGE DEWEY ZIMMERMAN
BY
ATTORNEY

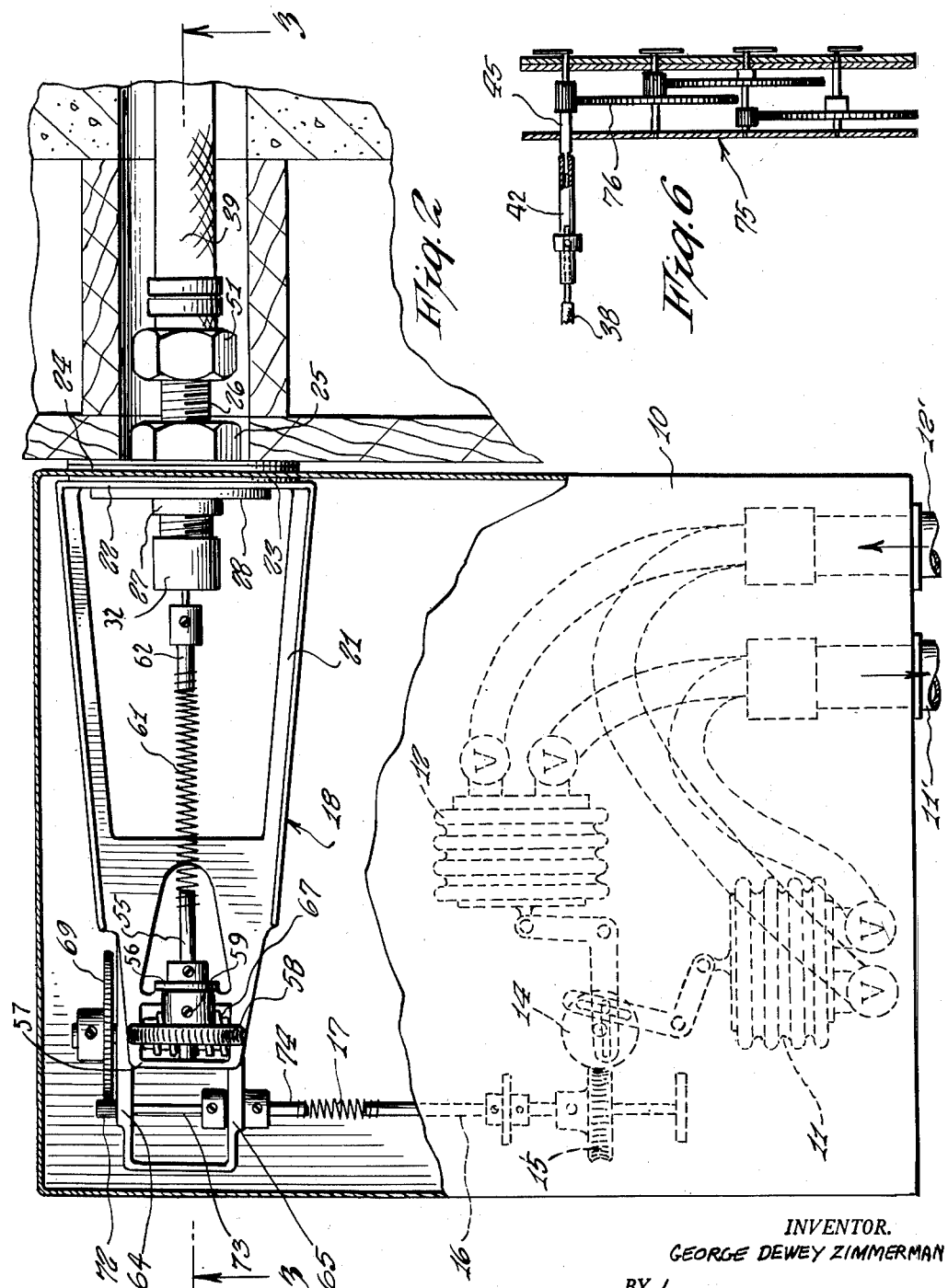

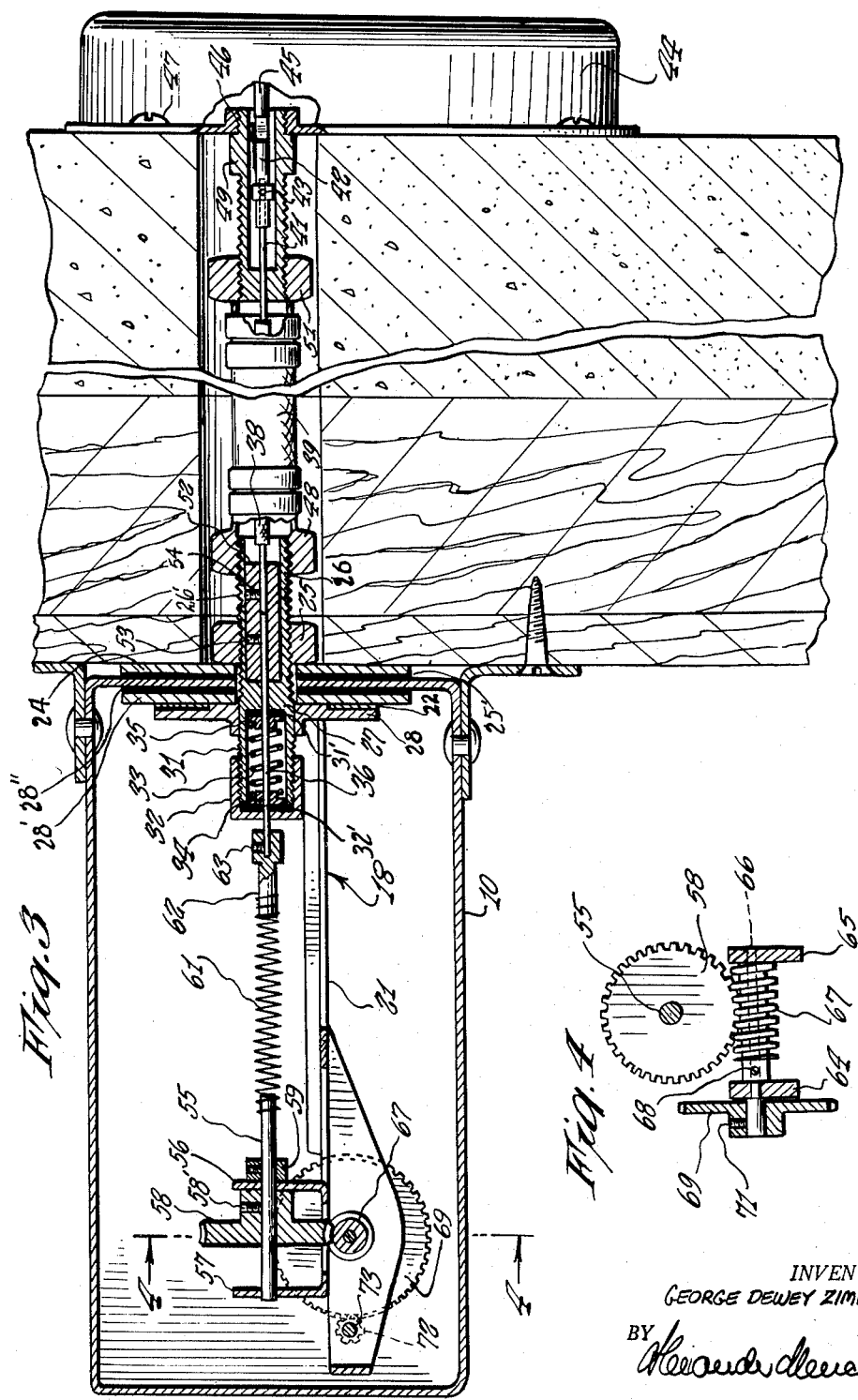
March 10, 1953    G. D. ZIMMERMAN    2,630,714
REMOTE INDICATOR DRIVING ATTACHMENT
FOR GAS METERING DEVICES
Filed Aug. 30, 1949    3 Sheets-Sheet 3
INVENTOR.
GEORGE DEWEY ZIMMERMAN Patented Mar. 10, 1953

2,630,714

UNITED STATES PATENT OFFICE 2,630,714

REMOTE INDICATOR DRIVING ATTACHMENT FOR GAS METERING DEVICES

George Dewey Zimmerman, Pelham Manor, N. Y.

Application August 30, 1949, Serial No. 113,035

3 Claims. (Cl. 73—272)

This invention relates to gas metering devices.

It is an object of the invention to allow the meter reader to obtain a reading from the meter from the outside of the house or a point removed from the same, without impairing the measuring capabilities of the meter.

It is another object of the present invention to provide a meter adapted to be read from the exterior of the house or at a remote point wherein the opening leaving the meter casing will be sealed so that should the parts of the meter become disengaged the gas collected within the casing will not escape to the interior of the building.

It is still another object of the present invention to provide a meter for measuring gas whereby the mechanism for taking the reading is removed from the meter casing wherein should the measuring mechanism become impaired, the meter will still function to deliver gas, and whereby the driving is effected through release clutches in the form of driving springs forming a part of the driving mechanism.

It is still another object of the present invention to provide a meter having a removed measuring mechanism wherein the installation of the same is permitted without resorting to precision measurements when the device is placed in position in the building and when the meter reading mechanism is connected to the driving parts of the meter, and wherein the connection of the recording or reading mechanism to the meter proper can be effected through a flexible shaft and made at a point removed from the meter proper.

It is still another object of the present invention to provide an attachment for standard gas metering devices which will permit the extension of an operating mechanism for the transmission of motion effected by the measuring equipment to the exterior of a building structure and to the measuring indicators whereby the taking of the meter readings can be made from the exterior of the house without necessity of entering the house and without the owner of the house or occupant being at home.

Other objects of the present invention are to provide a gas metering device having an operating mechanism adapted to extend through a building structure for connection with the indicating elements, which is of simple construction, inexpensive to manufacture, easy to install, compact, has a minimum number of parts, and efficient in operation.

For other objects and for a better understanding of the invention, reference may be had to the following detailed description taken in connection with the accompanying drawing, in which Fig. 1 is a fragmentary perspective view of the apparatus with the building wall cut away to show the parts extended therethrough.

Fig. 2 is an elevational view of the apparatus and of the attachment, the apparatus casing being broken away to show the attachment in full.

Fig. 3 is a longitudinal sectional view taken on line 3—3 of Fig. 2.

Fig. 4 is a vertical sectional view taken on line 4—4 of Fig. 3.

Fig. 5 is a fragmentary elevational view of the counting mechanism.

Fig. 6 is a transverse sectional view taken on line 6—6 of Fig. 5.

Referring now to the figures, 10 represents a casing housing the usual bellows devices 11 and 12 in which are connected inlet and outlet pipes 11' and 12' for effecting their operation. These bellows devices are connected with a crank wheel 14 which is geared to a driven gear 15 connected to a shaft 16 which in turn is connected through a driving spring 17 to the attachment indicated generally at 18 embodying the features of the present invention. This attachment is mounted within the casing 10 along with the bellows devices 11 and 12.

The attachment 18 comprises a frame 21 which has an attaching plate portion 22 which is brought flush against a washer 23 on the inner side of the casing 10 and upon the placement of exterior washers 24 on the exterior of the casing and the tightening of a nut 25 upon an externally threaded tube 26 extending through a hole in the casing 10 which has a projection of a body 27 having a plate portion 28, the frame 21 will be fixed to the casing. The connecting body 27 has a hollow threaded portion 31 adapted to receive an internally threaded cap 32. Within the hollow portion 31 is a spring 33 which acts between plates 34 and 35, that surround a drive shaft 36 extending through the body 27. This drive shaft is connected to a cable 38 within a hose extension 39. This cable is in turn connected to another shaft 41 to the end of which is connected a fitting 42 by means of a set screw 43.

The connecting body 27 is flanged by the plate portion 28 and will compress sealing washer 28'' through a metal plate 28'. This sealing washer or gasket 28'' prevents leakage from the space within the casing along with the inner wall face surrounding the opening through the casing. Another gasket 25' is placed on the exterior face of the casing and is held in place by the washer 24 as the nut 25 is tightened upon the body 27. Accordingly, the sides of the casing body wall will be tightly sealed to prevent leakage thereover.

The sealing through the body 27 is effected as follows. In the hollow portion 31 of the body 27 is a gasket 31' which is held tight against the bottom of the opening in the body 27 by the spring 33 and by compression plate 35. This gasket surrounds the drive shaft 36 tightly. Within the cap 32 is a gasket 32' which is acted upon by the plate 34 and spring pressed by the spring 33. The plates 34 and 35 have a shoulder which acts as a seat for the compression spring 33. The plates 34 and 35 have respectively holes through the center of the same equal to the size of the shaft 36 to enable the plates to act as journals. The hole in portion 31 containing the plates and the spring is of square section and the plates are square so that rotation of the plates within the hole is prevented. The gasket 32' is held in place within the cap 32 by the tight connection of the cap with the portion 31. The gaskets are all made of resilient and compressible material. The hole in portion 31 can be filled with a non-volatile liquid and one which has a low freezing point to prevent gas leakage and to provide a lubricant for the operation of the shaft in the plates 34 and 35 and in the body 27.

In assembling the arrangement, gasket 31' and plate 35 are first passed over the end of shaft 36 and pushed into the hole or opening of portion 31. Thereafter spring 33 surrounding shaft 36 is introduced into the hole of portion 31 and is seated at one end on plate 35. Then plate 34 and gasket 32' are slipped over the shaft 36, plate 34 serving as a seat for the opposite end of spring 33. The non-volatile liquid may now be passed into the opening of portion 31 and thereafter cap 32 slipped over shaft 36 may be applied and tightened. The pressure of the spring 33 compresses gaskets 31' and 32' against the walls of the body portion 31 and cap 32 respectively and also about shaft 36. This effectively seals the shaft 36 against the escape of gas from the galley or housing and at the same time allows the shaft to rotate. The liquid lubricates the shaft journal and also fills any minute pores in the shaft or in the gaskets 31' and 32'.

On the exterior of the building wall there is mounted a casing 44 having an input shaft 45 which is projected from the casing 44 at the rear thereof for connection with the fitting 42 and clip 46 thereof. The casing 44 is secured to the exterior of the building by screws 47.

To the body 27 and the projection 26 thereof there is connected a hose fitting 48 surrounding the cable 38. Surrounding the fitting 42 is an attachment sleeve 49, housing the fitting 42 and shaft 45 and to which is connected a fitting 51 of the hose 39 surrounding the cable 38. The cable 38 and the hose 39 can be of different lengths depending upon the thickness of the building wall. Likewise, the fittings 48 and 51 of the hose 39 can be adjusted to different positions upon the body 27 and the attachment 49 respectively. To have the shaft 36 run evenly within the threaded projection 26 and to provide for the coupling of shafts 36 and 41 there is provided a connector 52 having set screws 53 and 54.

To effect disconnection, access is had to screw 54 of the connector 52 through a hole 26' in the threaded projection 26 of the body 27 and is loosened.

At the rear end of the frame 21 there is mounted a driving shaft 55 on upstanding struck up projections 56 and 57 of the frame 21. This shaft has a large gear 58 connected to the same by means of a set screw 58'. The gear is held in place between the projections 56 and 57 and against forward displacement by engagement with the upstanding projection 56. The shaft 55 and the gear 58 are held against rearward displacement by a set collar 59 on the shaft and abutting with the projection 56. This shaft 55 is connected through a driving spring 61 to a connecting member 62 which is in turn connected to the small shaft 36 by means of a set screw 63.

The frame 21 has depending projections or bearing portions 64 and 65 in which is journalled a shaft 66 carrying worm gear 67 meshing with the large gear 58. This worm gear is made secure on the shaft 66 by a set screw 68, Fig. 4.

On the outer end of the shaft 66 there is fixed a large gear 69 by means of set screw 71, Fig. 4, and this gear is driven by a small pinion 72 connected to a shaft 73 also extending between the depending bearing portions 64 and 65.

The spring 17 of the driving shaft leading from the bellows devices 11 and 12 is connected with the pinion shaft extension 74.

In operation, as the bellows devices 11 and 12 are worked, the gear 15 and the shaft 16 will be driven. This rotative motion will be transmitted through spring 17 to the shaft extension 74 to rotate pinion 72. The pinion 72 in turn will rotate large gear 69 and worm 67. The worm meshes with the worm wheel 58 to drive shaft 55. From the shaft 55, after the reduction in speed has been effected from the reducing gears, there is transmitted through spring 61, shaft extension 62, small shaft 36, cable 38, shaft 41 and finally shaft 45 of the measuring indicating mechanism indicated generally at 75 and disposed within the casing 44. This indicating mechanism 75 has the usual train of gears 76, dials 77 and indicating pointers 78. These dials in the indicator can be observed through a window opening 79 in the casing.

It will accordingly be apparent that the meter reading man can take the reading without having to enter the building. It should be further apparent that sufficient adjustment can be had of the length of the various wires or shafts in passing from the facing in the interior of the building to the exterior so that a ready adaptation can be made of the apparatus to any building wall width. It should be further apparent that the driving parts have sufficient resiliency through the driving springs that there is little chance for the destruction of these shafts and that adequate reduction in the speed of the rotation of the various shafts for delivery to the indicating mechanism is made simple, compact and easy to be adapted to the interior casing.

It will be apparent further that the gear reduction for the drive of the indicating or counting mechanism 75 is within the casing 10 so that the rotation of the shaft passing through the casing and the flexible cable 38 is kept to a bare minimum and the problem of sealing the opening through the casing is reduced. Accordingly, the seal effected by means of the gaskets in the manner as above described will, because of the slow rate of rotation of the shaft 36 effectively seal the casing and prevent the outward flow of gas therefrom and with little wear. The spring couplings 17 and 61 serve not only as a coupling means between the drive shafts but also as overload clutches. The ends of the springs are merely tightly fitted about the shafts and upon an overload taking place in the system, the ends of these springs will be released and allow slippage whereby the parts of the mechanism will be permitted from becoming distorted or bent.

While various changes may be made in the detail construction, it shall be understood that such changes shall be within the spirit and scope of the present invention as defined by the appended claims.

What is claimed is:

1. The improvement in a metering apparatus having a closed casing and a shaft rotatable in accordance with the flow of fluid therethrough, comprising a gear reduction attachment having a frame and adapted to be connected to the rotatable shaft, a bushing extending through an opening in a wall of the casing, a flange secured to the bushing and bearing against the frame of the attachment to hold the same in place within the casing, gaskets surrounding the bushing and disposed respectively upon the opposite faces of the casing wall, compression plates bearing against the gaskets and a nut upon the bushing securing the same tightly thereon and bringing the gaskets into tight relationship with the faces of the casing, said bushing having an intermediate portion with a small opening therethrough and enlarged openings in axial alignment therewith at the opposite sides of the intermediate portion, a small drive shaft extending through the bushing and the small opening of the intermediate portion, means for drivingly connecting the drive shaft to the gear reduction unit, a cap on the inner end of the bushing having an opening through which the small shaft extends, sealing means disposed within one of the enlarged openings in the bushing being retained therein by said cap, said sealing means comprising a spring surrounding said small shaft in the bushing, gaskets disposed respectively in the bottom of the enlarged opening and in the cap and surrounding tightly the small shaft, plates bearing respectively against the respective gaskets within the enlarged opening and said spring having its respective ends engaging the respective plates whereby fluid will be prevented from escaping around the bushing and along the shaft rotatable therein.

2. The improvement in a metering apparatus having a closed casing and a shaft rotatable in accordance with the flow of fluid therein as defined in claim 1, and a connector in the enlarged opening in the opposite end of said bushing and rotatable therein, set screw means for connecting the small shaft to the connector, and set screw means adapted for the attachment of another shaft to the connector, said connector serving to hold said small shaft, against axial displacement toward the interior of the casing.

3. The improvement in a metering apparatus having an enclosed casing and a shaft rotatable in accordance with the flow of fluid therethrough, comprising a gear reduction attachment drivingly connected to the rotatable shaft and having a frame adapted to be connected to the interior of the casing, a bushing extending through an opening in a wall of the casing, means for securing said bushing to the casing and bearing against the frame of the gear reduction attachment to hold the same in place within the casing, said bushing having a small opening therein, a small shaft rotatable in said small opening of the bushing, said gear reduction attachment having an output shaft coaxially aligned with the small shaft in the bushing, said small shaft having a connecting member secured to it and axially spaced from the output shaft of the gear reduction attachment, a coil spring extending between the gear reduction output shaft and the connecting member with its ends overlapping the output shaft member and the connecting member and having frictional engagement therewith whereby to permit slippage between the gear reduction unit and the small shaft upon an overload being effected.

GEORGE DEWEY ZIMMERMAN.

REFERENCES CITED

The following references are of record in the file of this patent:

UNITED STATES PATENTS

| Number | Name | Date |
|---|---|---|
| 1,126,780 | Jones | Feb. 2, 1915 |
| 1,566,816 | Carlson | Dec. 22, 1925 |
| 1,840,218 | Waddell | Jan. 5, 1932 |
| 1,861,275 | Hopkins | May 31, 1932 |
| 2,094,711 | Leininger | Oct. 5, 1937 |
| 2,158,839 | Smith et al. | May 16, 1939 |

FOREIGN PATENTS

| Number | Country | Date |
|---|---|---|
| 63,609 | Switzerland | Nov. 4, 1912 |